(12) United States Patent
Ryu et al.

(10) Patent No.: US 7,178,770 B2
(45) Date of Patent: Feb. 20, 2007

(54) ARTICLE SUPPORT DEVICE

(75) Inventors: Hideki Ryu, Tokyo (JP); Makoto Daimon, Tokyo (JP); Junko Maruyama, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/484,299

(22) PCT Filed: Jul. 19, 2002

(86) PCT No.: PCT/US02/22970

§ 371 (c)(1),
(2), (4) Date: Jan. 20, 2004

(87) PCT Pub. No.: WO03/007762

PCT Pub. Date: Jan. 30, 2003

(65) Prior Publication Data

US 2004/0188580 A1    Sep. 30, 2004

(30) Foreign Application Priority Data

Jul. 19, 2001    (JP) .............................. 2001-220056

(51) Int. Cl.
*A47G 1/17* (2006.01)
(52) U.S. Cl. ................... 248/205.3; 248/304; 428/343
(58) Field of Classification Search ............ 248/205.3, 248/205.4, 304, 308
See application file for complete search history.

(56) References Cited

U.S. PATENT DOCUMENTS

| | | | | | |
|---|---|---|---|---|---|
| 2,893,676 | A | * | 7/1959 | Connors et al. ....... | 248/222.14 |
| 3,848,843 | A | * | 11/1974 | Levy ..................... | 248/224.51 |
| 4,923,159 | A | * | 5/1990 | Wang et al. ............. | 248/205.3 |
| 5,507,464 | A | * | 4/1996 | Hamerski et al. .......... | 248/683 |
| 5,967,474 | A | | 10/1999 | doCanto et al. | |
| 6,106,937 | A | | 8/2000 | Hamerski | |
| 6,349,904 | B1 | * | 2/2002 | Polad ........................ | 248/74.3 |
| 6,499,707 | B2 | * | 12/2002 | Hamerski et al. ........ | 248/205.3 |
| 6,629,680 | B2 | * | 10/2003 | Weck et al. ............. | 248/475.1 |
| 6,676,093 | B2 | * | 1/2004 | Franck et al. ............ | 248/205.3 |

FOREIGN PATENT DOCUMENTS

| | | |
|---|---|---|
| DE | 196 32 182 | 2/1998 |
| JP | 8-50794 | 2/1996 |
| WO | 94/21157 | 9/1994 |
| WO | WO 01/34717 | 5/2001 |

* cited by examiner

*Primary Examiner*—Anita King
*Assistant Examiner*—Steven Marsh
(74) *Attorney, Agent, or Firm*—Trisha D. Adamson (57) ABSTRACT

An article support device (10) includes a support body (14) having an article support section (12) and a cover member (16) movably coupled to the support body (14). When the device is used, the support body (14) is fixedly adhered with a stretch-releasable adhesive tape member (18) and is attached to a surface (36) by the adhesive tape member (18) with a non adhesive pull tab portion (18a) of the adhesive tape member (18) projecting outwardly from one longitudinal end of the support body (14). In this condition, a portion of the cover member (16) is capable of moving between a first position for hiding the pull tab portion (18a) projecting outwardly from behind the support body (14) and a second position for exposing the pull tab portion (18a) of the adhesive tape member (18).

5 Claims, 10 Drawing Sheets

ARTICLE SUPPORT DEVICE

FIELD OF THE INVENTION

The present invention relates to an article support device to be attached to a surface using a stretch-releasable adhesive tape member and for mounting an object or article on the surface.

BACKGROUND OF INVENTION

Article support devices having hooks, clips, hangers, and other various types of article support members used for mounting utensils, decorations, tools and various other articles or objects on walls, columns, furniture and other surfaces are known. In recent years, in this type of article support device, to facilitate attachment and detachment of the article support device to and from the surface, it has been proposed to use a stretch releasable adhesive tape to attach the article support device to the surface.

A stretch releasable adhesive tape is known as a two-sided adhesive tape having the properties of extreme ease of stretching and substantially no return from the stretched state. As one example, there is the product commercially available from 3M Company, St. Paul, Minn. under the trade designation COMMAND adhesive. This type of stretch releasable adhesive tape is interposed between the surfaces of two objects to firmly fasten the two objects to each other. At the same time, by gripping and stretching outward one end of the adhesive tape member in the fastened state, it can be removed from the surfaces of the two objects relatively easily without damaging the surfaces and without leaving adhesive residue.

Article support devices using stretch releasable adhesive tapes have typically included a mount body having a mounter and a baseplate attached movably or removably to the mount body, and the adhesive tape member is adhered to the baseplate (for example, see Japanese National Publication (Tokuhyo) No. 8-507941 and U.S. Pat. No. 5,967,474). In this configuration, the baseplate is affixed to the stretch releasable adhesive tape and is attached to a desired surface by the adhesive tape with a non-adhesive pull tab projecting out from behind the baseplate. Further, the mount body is designed to be able to be selectively placed on the baseplate at either a first position concealing both the baseplate and the non-adhesive pull tab sticking out from the baseplate and a second position exposing the two.

When a conventional article support device having this configuration is attached to a surface using a stretch releasable adhesive tape, it is possible to mount a desired object on the mounter of the mount body while the mount body is at the first position. Further, when detaching the article support device from the base surface, the mount body is moved from the first position to the second position and the non-adhesive pull tab is gripped and stretched so as to remove the adhesive tape member from the baseplate and the base surface. Note that the mount body in a conventional article support device is designed to be able to be moved between the first and second positions by a configuration where it is attached and removed to and from the baseplate by a straight sliding system by a slide structure (Japanese National Publication (Tokuhyo) 8-507941), by a configuration where it is pivotally connected to the baseplate by an integral hinge (U.S. Pat. No. 5,967,474), etc.

In the above conventional article support devices, the mount body having the mounter is not directly fastened to the adhesive tape, so sometimes the mount body is unintentionally displaced from the first position on the baseplate due to it being struck by another object or another outside force during use (that is, while the mount body is at the first position) and the normal mounting function can no longer be exhibited. To eliminate this inconvenience, it may be considered to provide a holding structure for engaging and holding the mount body on the baseplate and strengthen the holding force of the holding structure. If the holding force of the holding structure is too strong, however, when trying to detach the article support device from the base surface, it will become difficult to move the mount body from the first position to the second position on the baseplate.

Further, when placing the mount body at the second position and removing the adhesive tape from the baseplate and the base surface by stretching it using one hand, it is desirable to the baseplate by the other hand so that the article support device will not fly away due to the elasticity of the adhesive tape in the instant when the adhesive tape is stretch removed from the base surface. Currently, in conventional article support devices, the baseplate is smaller and thinner than the mount body and as a result it tends to become difficult to handily stretch remove the adhesive tape.

It would therefore be desirable to provide an article support device that can be attached to a surface using a stretch releasable adhesive tape where the normal mounting function can be stably exhibited in the face of outside force unintentionally received during use and further where the work of removing the adhesive tape can be performed handily and easily.

SUMMARY OF THE INVENTION

The present invention provides an article support device capable of being attached to a surface using a stretch-releasable adhesive tape member to support an article on the surface, characterized in that the device comprising a support body including an article support section; and a cover member movably coupled to the support body; that the support body is capable of being fixedly adhered with a stretch-releasable adhesive tape member and being attached to the surface using the adhesive tape member, with a part of the adhesive tape member projecting outward from the support body; and that the cover member is capable of moving between a first position for hiding the part of the stretch-releasable adhesive tape member projecting from the support body and a second position for exposing the part of the adhesive tape member, during a condition where the support body is attached to the surface through the adhesive tape member.

In another aspect, the invention provides such an article support device further comprising a holding mechanism for securely holding the cover member in the first position on the support body.

In yet another aspect, the invention provides such an article support device wherein the cover member linearly moves and rotates relative to the support body, to shift between the first and second positions.

In another embodiment, the invention provides an such article support device wherein the cover member rotates relative to the support body, to shift between the first and second positions.

In a specific embodiment, the invention provides an article support device wherein the article support section of the support body includes a hook.

DETAILED DESCRIPTION

Next, embodiments of the present invention will be explained in detail with reference to the attached drawings. In the drawings, the same or similar components are assigned common reference numerals.

Figure 1:
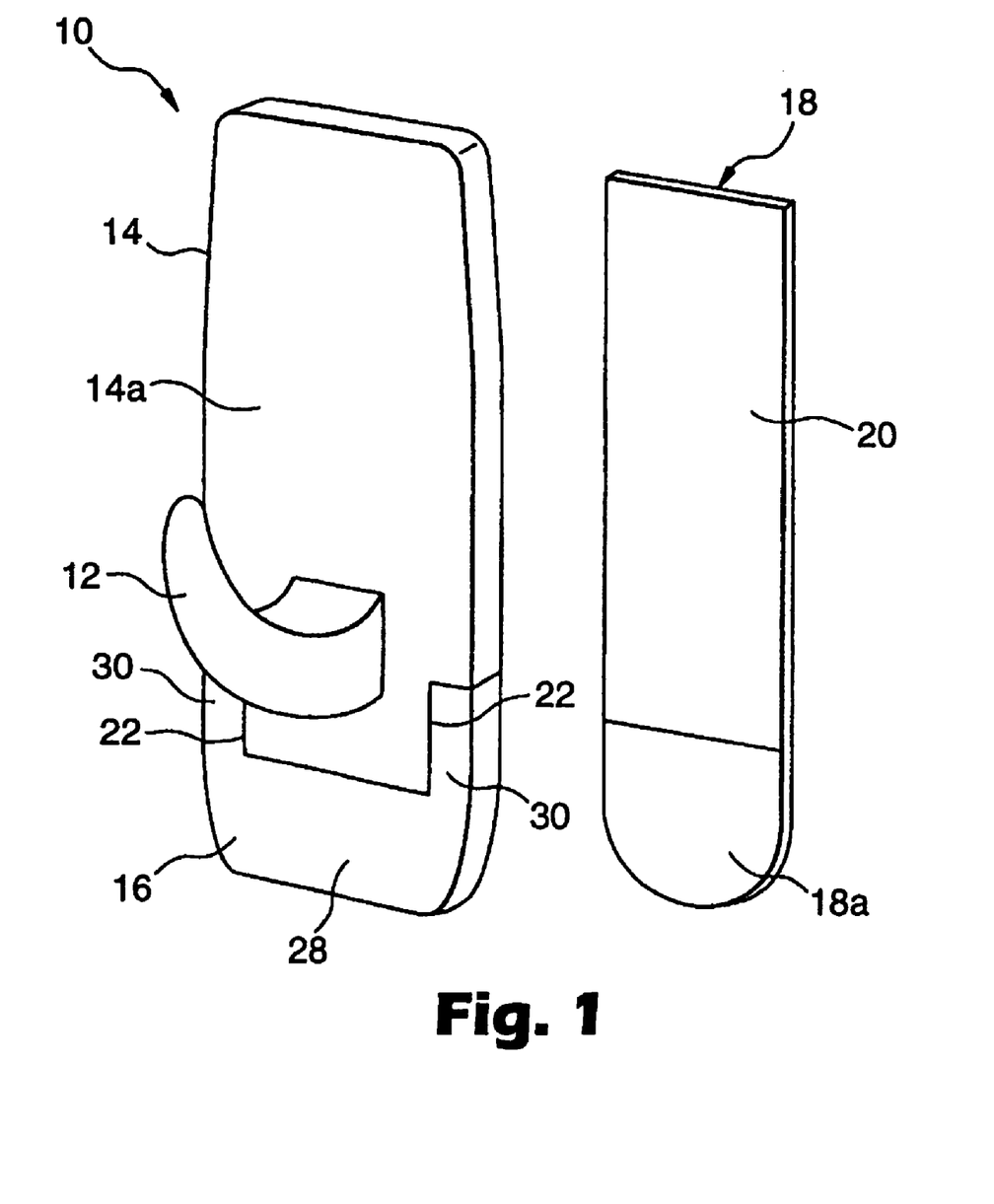
FIG. 1 is a perspective view showing an article support device according to an embodiment of the present invention together with a stretch releasable adhesive tape member.
Figure 2A:
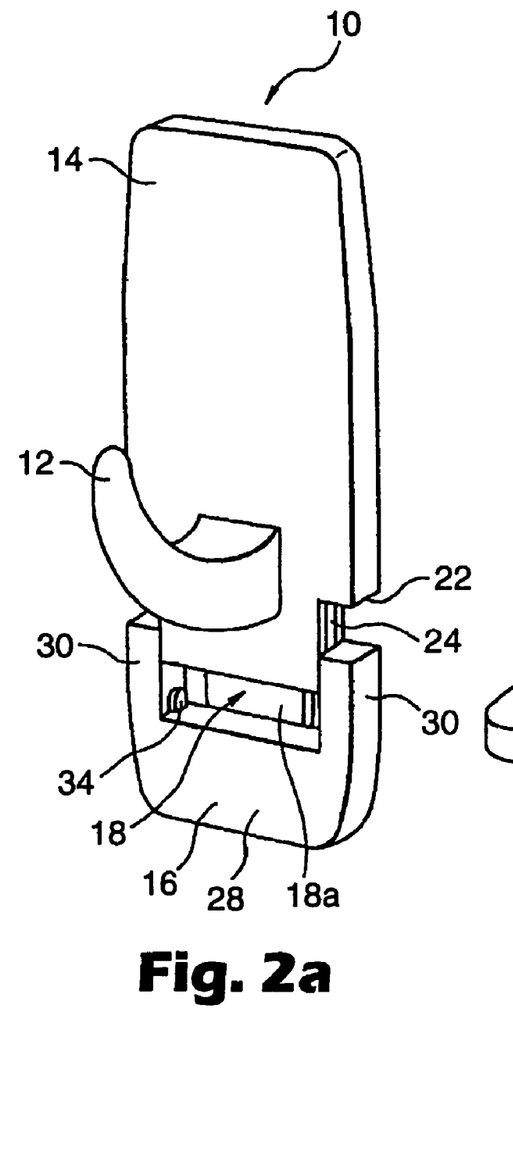
FIGS. 2a and 2b are perspective views showing the procedure for removing the article support device from a base surface, where (a) shows the state where a cover member is at an intermediate position and (b) shows the state where the cover member is at a second position.
Figure 2B:
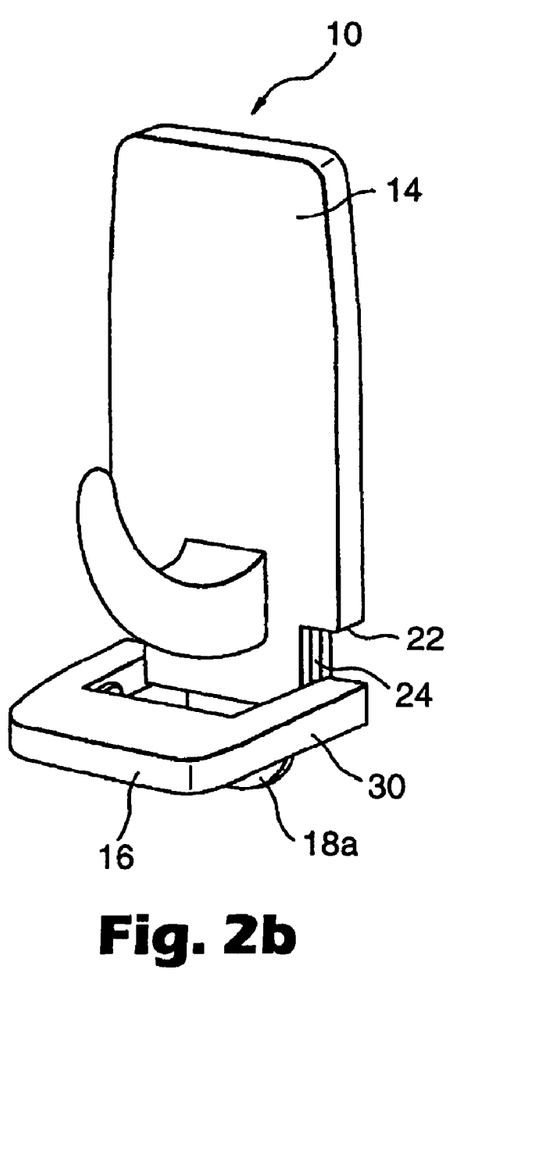
Figure 3:
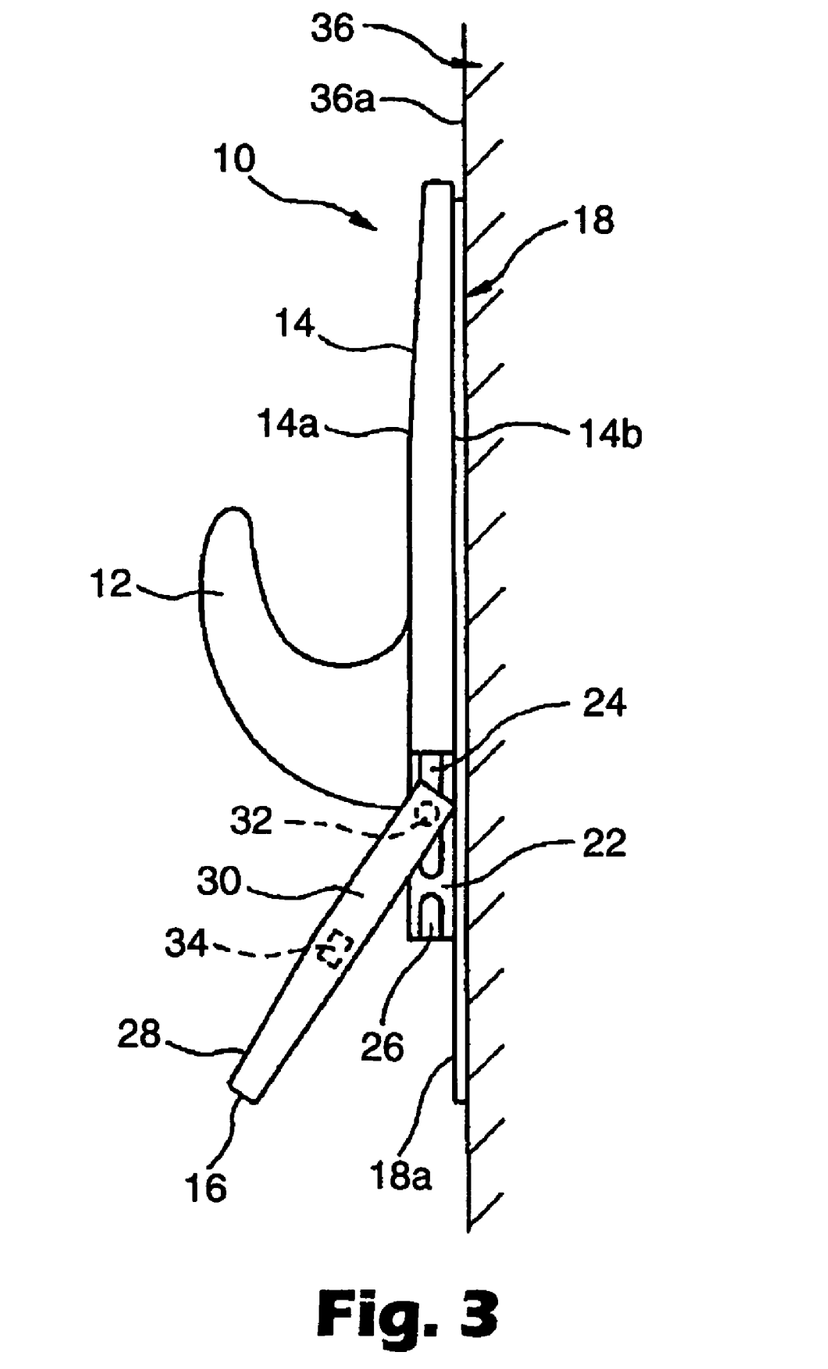
FIG. 3 is a side view showing the article support device of FIG. 1 in a state attached to a base surface.

Referring to the figures, FIG. 1 is a perspective view showing an article support device 10 according to an embodiment of the present invention together with the stretch-releasable adhesive tape member, FIG. 2 gives perspective views of the procedure for removing the article support device 10 from a surface, and FIG. 3 is a side view of the article support device 10 in a state attached to a surface.

The article support device 10 is provided with a support (or mount) body 14 having an article support section (or a mounter) 12 and a cover member 16 connected movably to the mount body 14. The mounter 12 has a curved shape functioning as a hook and projects outwardly from one surface 14a adjacent one end (bottom end in the figure) of a substantially rectangular-plate like mount body 14 in the longitudinal direction. The mounter 12 is preferably formed integrally with the mount body 14 by the same plastic material as the mount body 14. Alternatively, the mounter 12 may be formed separately from the mount body 14 and then fastened to the mount body 14.

The mount body 14 is designed so that a stretch-releasable adhesive tape 18 can be adhered to a substantially flat back surface 14b on the opposite side to the front surface 14a. The stretch releasable adhesive tape 18 is a two-sided adhesive tape and having the properties of extreme ease of stretching and preferably substantially no return from the stretched state and formed to a substantially rectangular strip generally corresponding to the shape of the mount body 14. The adhesive tape member 18 has non-adhesive surfaces at its two sides at a predetermined region near one end in the longitudinal direction that form a non-adhesive pull tab. This non-adhesive region functions as the grip portion 18a to be gripped by a user at the time of the later explained removal operation. Normally, the adhesive surfaces at the two sides of the adhesive tape 18 are protected by release liners 20 before use (only the release sheet 20 of one side shown). A preferred adhesive tape 18 for use with the article support device 10 is available from 3M Company, St. Paul, Minn. under the trade designation COMMAND adhesive.

Near one end of the mount body 14 in the longitudinal direction (bottom end in the figure) are provided substantially rectangular notch portions 22 at the two sides. Long and short grooves 24 and 26 extending in the longitudinal direction of the mount body 14 across predetermined lengths are formed along the end faces of the notch portions 22. The long grooves 24 extend straight from base ends of the notch portions 22 (top ends in the figure) to the middle, while the short grooves 26 extend and open to the terminal ends of the notch portions 22 (bottom ends in the figure) along extensions of the long grooves 24.

The cover member 16 is a substantially U-shaped contour flat piece having a substantially rectangular main portion 28 and a pair of arm portions 30 extending substantially in parallel to each other from one edge of the main portion 28. The two arm portions 30 of the cover member 16 are formed with pairs of projections 32 and 34 arranged apart from each other at the facing inside surfaces. The projections 32 arranged at the terminal ends of the arm portions 30 (top ends in the figure) slidably fit into the long grooves 24 formed in the notch portions 22 of the mount body 14. In this manner, the cover member 16 is connected in a linearly movable and pivotable manner to the mount body 14 by the projections 32 of the two arm portions 30 functioning as pins engaged slidably with the two long grooves 24 of the mount body 14 (hereinafter called the "pins 32").

The projections 34 arranged at the base ends of the arm portions 30 of the cover member 16 (bottom ends in the figure) have dimensions and shapes enabling them to be engaged in a fastening manner with the short grooves 26 formed in the notch portions 22 of the mount body 14. These projections 34 engage and hold the cover member 16 at the first position on the mount body 14 by engaging with the two short grooves 26 of the mount body 14 and functioning as holding tabs (hereinafter referred to as "holding tabs 34") when the article support device 10 is in the usage state shown in FIG. 1 (that is, when the cover member 16 is in the later explained first position).

When the article support device 10 is in the usage state shown in FIG. 1, the pair of arm portions 30 of the cover member 16 are fit snugly in the pair of notch portions 22 of the mount body 14 so as not to substantially form any gap with the mount body 14 and the cover member 16 and so that the outer edges of the two sides of the mount body 14 and the outer edges of the pair of arm portions 30 are substantially flush. The cover member 16 is preferably formed from the same plastic material as the mount body 14.

As shown in FIG. 3, the article support device 10 is attached to a relatively hard surface 36 such as a wall, column, furniture, etc. using a stretch releasable adhesive tape member 18 and mounts a utensil, decoration, tool, or various other types of objects on the base surface 36 by hanging it on the mounter 12. At the time of use, the mount body 14 is fastened to the stretch releasable adhesive tape 18 and is attached to the surface 36*a* of the base surface 36 through the adhesive tape member 18 in the state with the grip portion 18*a* of the adhesive tape member 18 projecting outwardly from one end of the mount body 14 in the longitudinal direction at the side adjoining the notch portions 22. In addition, by attaching the mount body 14 to the base surface 36 through the adhesive tape 18 in this way, the cover member 16 can be moved between a first position concealing the grip portion 18*a* of the adhesive tape member 18 projecting outwardly from the mount body 14 (FIG. 1) and a second position exposing the grip portion 18*a* of the adhesive tape member 18 (FIG. 2(*b*)).

When the article support device 10 is in the normal usage state, the cover member 16 is placed at the first position. In this position, the two arm portions 30 of the cover member 16 are fit snugly in the corresponding notch portions 22 of the mount body 14 and the holding tabs 34 are fit in a fastening manner in the corresponding short grooves 26. As a result, the cover member 16 is engaged and held at the first position on the mount body 14. During this time, the mount body 14 is firmly affixed to the surface 36*a* of the base surface 36 directly by the stretch releasable adhesive tape 18, so an object of a predetermined weight can be hung on the mounter 12 and a normal mount function can be stably exhibited in the face of striking by another object or another outside force able to be unintentionally received during use. Further, since the main portion 28 of the cover member 16 conceals the grip portion 18*a* of the adhesive tape member 18, it is possible to ensure an aesthetically desirable appearance of the article support device 10.

When detaching the article support device 10 from the base surface 36, a user grips the cover member 16, applies force in the longitudinal direction so that it moves away from the mount body 14, and detaches the holding tabs 34 from the corresponding short grooves 26. In this manner, the cover member 16 leaves the first position and moves straight under sliding engagement of the pins 32 of the two arm portions 30 and the corresponding long grooves 24 of the mount body 14 (FIG. 2(*a*)). The user then pivots the cover member 16 about the two pins 32 to move it to the second position where the main portion 28 is positioned under the mount 12 (FIG. 2(*b*)). Next, the user uses one hand to firmly grasp the mount 12 of the mount body 14 while holding the cover member 16 at the second position and uses the other hand to grip the grip portion 18*a* of the exposed adhesive tape member 18 and stretch it in a direction away from the mount body 14. Upon stretching, the adhesive tape member 18 is removed from the back surface 14*b* of the mount body 14 and the surface 36*a* of the base surface 36 relatively easily without damaging the surfaces 14*b* and 36*a*.

In this way, when stretching the adhesive tape member 18 using one hand to stretch remove it off from the mount body 14 and base surface 36, it is possible to firmly hold down the mount body 14 relatively easily using the other hand so that the article support device 10 does not fly away due to the elasticity of the adhesive tape member 18 at the instant when the adhesive tape member 18 releases from the base surface 36. As a result, even a beginner can readily stretch and remove the adhesive tape member 18.

It will be recognized that the article support device according to the present invention is not limited to the above embodiment and that it is possible to employ various configurations as explained below within the disclosure of the claims.

Figure 4:
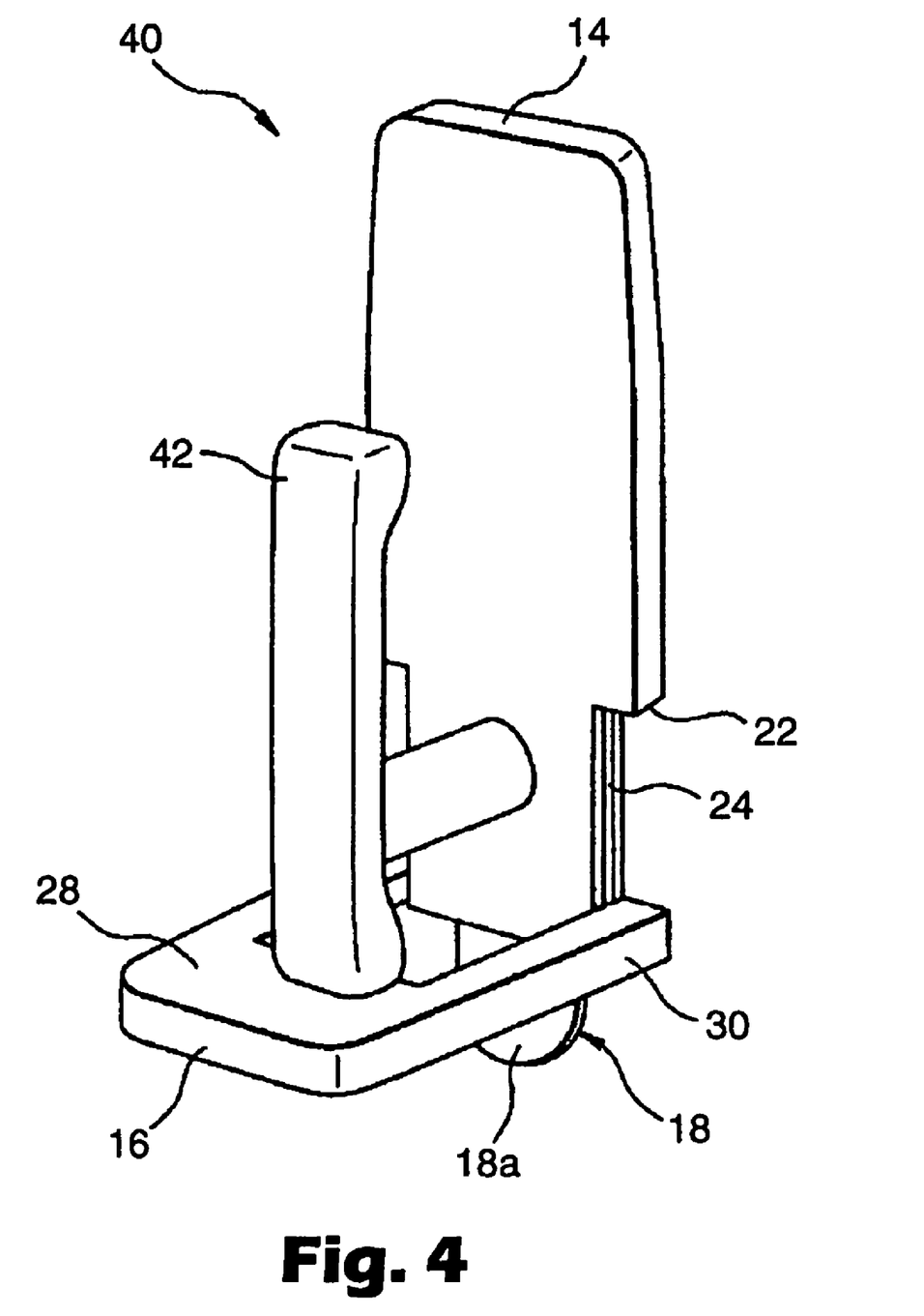
FIG. 4 is a perspective view of an article support device according to another embodiment of the present invention shown in the state where the cover member is at a second position.

FIG. 4 shows an article support device 40 according to another embodiment of the present invention. The article support device 40 has substantially the same configuration as the above article support device 10 except for the configuration of the mounter, so corresponding components are assigned common reference numerals and explanations thereof are omitted. That is, the article support device 40 is provided with a mount body 14 having a mounter 42 and a cover member 16 movably connected to the mount body 14. The mounter 42 has a substantially T-projecting shape able to effectively function as, for example, a curtain sash hook.

In the article support device 40, the mounter 42 sticks out further from the surface 14*a* of the mount body 14 and extends farther in the longitudinal direction of the mount body 14 (in particular up to close to the bottom end in the illustrated longitudinal direction) compared with the mounter 12 of the general shape shown in FIG. 1. Therefore, as illustrated, the position about the center of rotation of the two arm portions 30 (pins 32 of FIG. 3) when the cover member 16 is placed at the second position is preferably as far away as possible from the integral connection portion of the mounter 42 and the mount body 14 so that the grip portion 18*a* of the adhesive tape member 18 can be sufficiently exposed while avoiding interference between the main portion 28 of the cover member 16 and the mounter 42. Further, as explained above, it is advantageous if the main portion 28 of the cover member 16 is positioned directly under the mounter 42 at the second position so that a user can easily and firmly grip the mounter 42 while holding the cover member 16 at the second position by one hand. Thus, with the article support device 40, the pair of notch portions 22 and long grooves 25 of the mount body 14 and the pair of arm portions 30 of the cover member 16 are formed longer than the case of the article support device 10 of FIG. 1.

Figure 5:
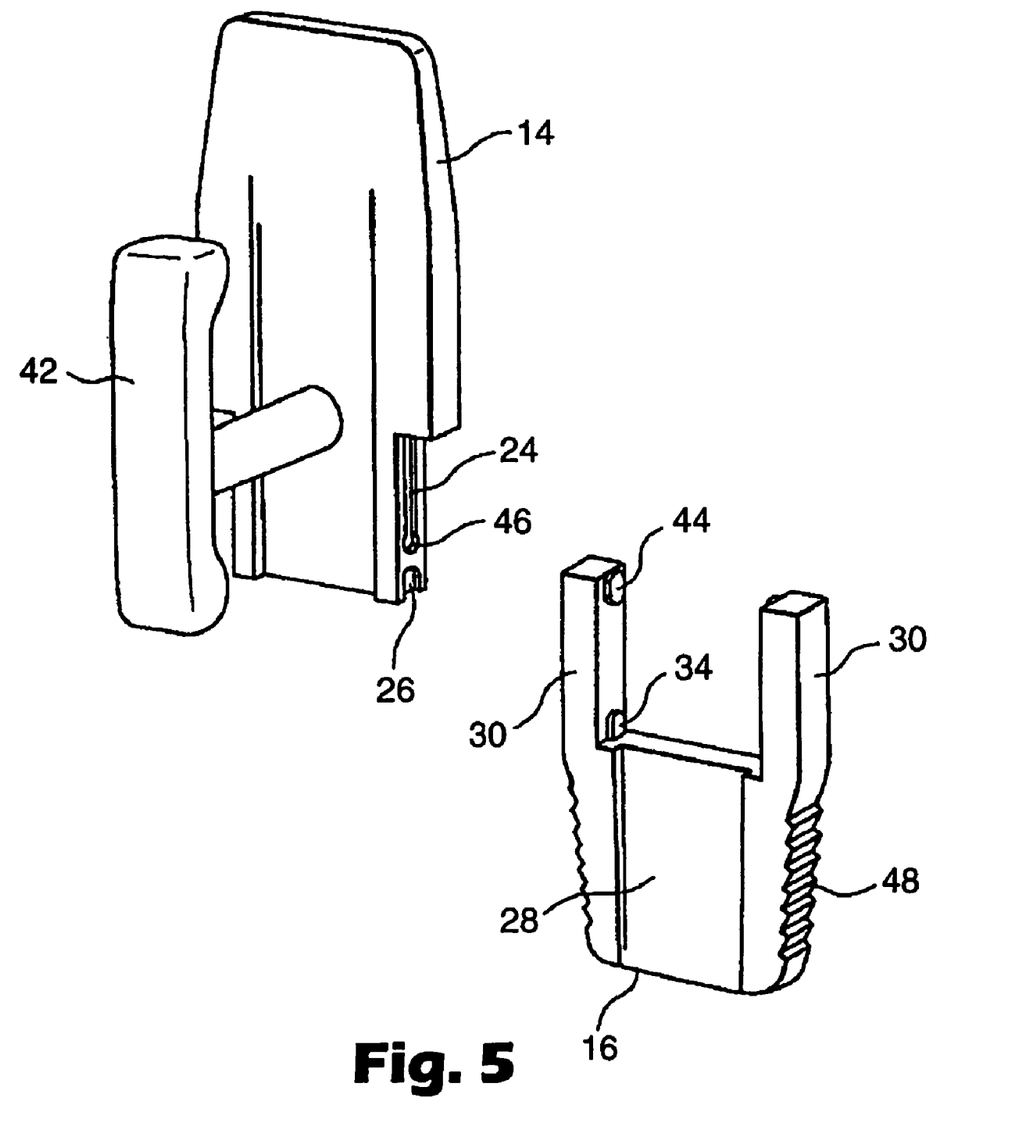
FIG. 5 is a disassembled perspective view of a modification of the article support device of FIG. 4.

In the article support device 10 shown in FIG. 1, as shown in FIG. 3, even at the intermediate position where the pins 32 of the cover member 16 do not reach the terminal ends of the corresponding long grooves 24 (bottom ends in the figure), it is possible to pivot the cover member 16 and place it at the second position. In the article support device 40 shown in FIG. 4, however, as explained above, the center of rotation of the cover member 16 being set at the terminal ends of the long grooves 24 (bottom ends in the figure) is essential from the viewpoint of facilitating the later work of stretching the adhesive tape member 18. Therefore, as shown as a modification in FIG. 5, it is advantageous if the pair of arm portions 30 of the cover member 16 are formed with pins 44 of substantially oval cross-sections enabling engagement and straight sliding action with the long grooves 24 of the mount body 14 and if the terminal ends of the long grooves (bottom ends in the figure) are formed with circular grooves 46 allowing pivoting of the pins 44. According to this configuration, the pivoting of the cover member 16 to the second position becomes possible only when the pins 44 are placed at the terminal ends of the long grooves 24 (bottom ends in the figure) even without the user keeping this in mind. Note that in the illustrated example, anti-slip serrations 48 for enabling a firm grip by the user are preferably formed at the two sides of the main portion 28 of the cover member.

Figure 6A:
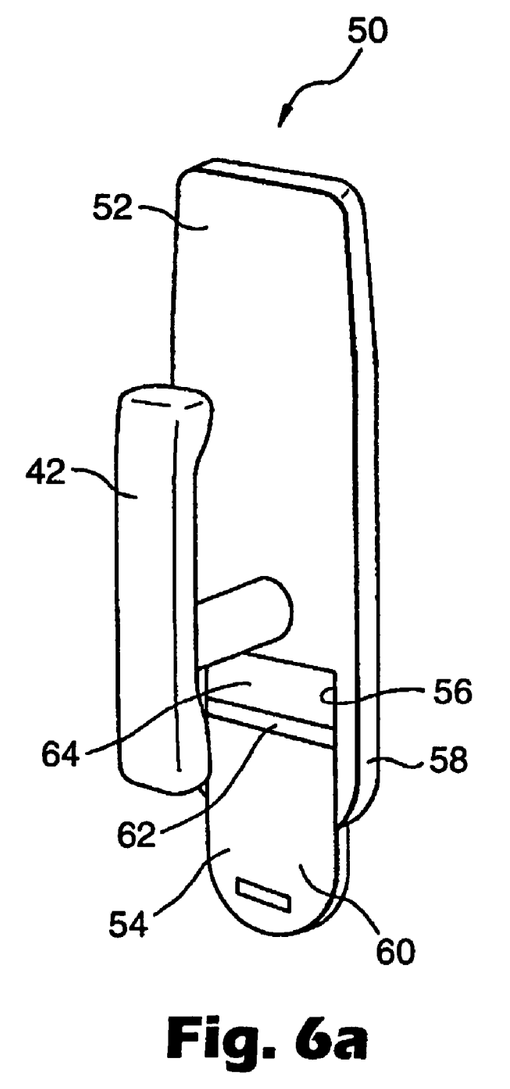
FIGS. 6a and 6b are perspective views of an article support device according to another embodiment of the present invention, where (a) shows the state where the cover member is at a first position and (b) shows the state where the cover member is at a second position.
Figure 6B:
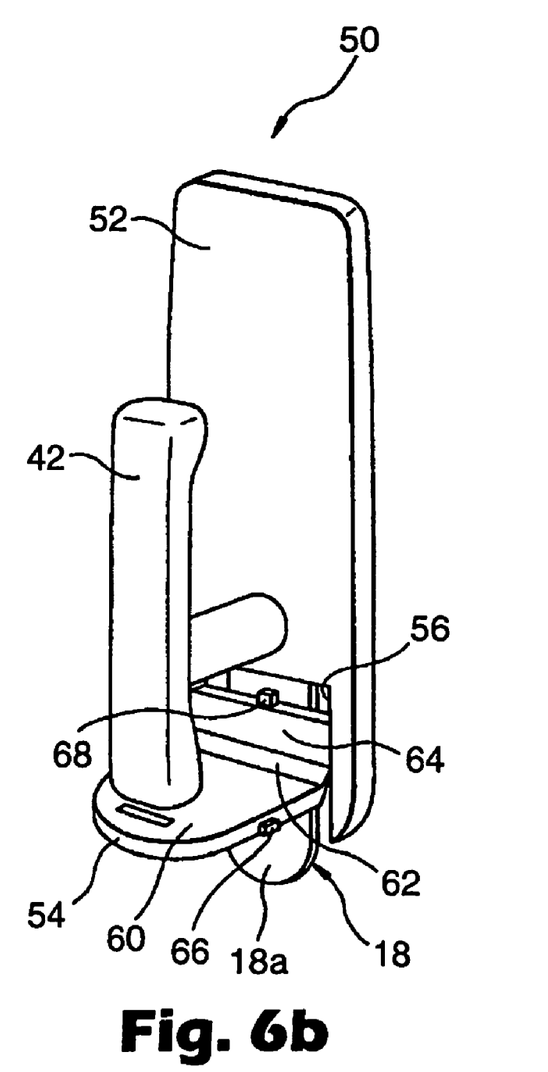

FIG. 6 shows an article support device 50 according to still another embodiment of the present invention. The article support device 50 has substantially the same configuration as the above article support device 40 except for the configurations of the mount body and the cover member, so corresponding components are assigned common reference numerals and explanations thereof are omitted. That is, the article support device 50 is provided with a mount body 52 having a mounter 42 and a cover member 54 movably connected to the mount body 52.

The mount body 52 is provided with a single substantially rectangular notch portion 56, instead of the above pair of notch portions 22, formed at one end in the longitudinal direction (bottom end in the figure). Long and short grooves (not shown) corresponding to the above long grooves 24 and short grooves 26 are formed along the facing surfaces of the pair of extending pieces 58 defining the notch portion 56. The cover member 54 has a main portion 60 having a substantially semioval contour and one arm portion 64 connected to one edge of the main portion 60 through an integral hinge 62. The arm portion 64 of the cover member 54 is provided with projecting pins (not shown) corresponding to the above-mentioned pins 32 at the two side edges. Further, the main portion 60 of the cover member 54 is provided with projecting holding tabs 66 corresponding to the above-mentioned holding tabs 34 at the two side edges. Further, the arm portion 64 of the cover member 54 is formed with a holding tab 68 on the other side edge.

During use, the mount body 52 of the article support device 50 is fastened to the adhesive tape member 18 and attached to the base surface through the adhesive tape member 18 in the state with the grip portion 18a of the stretch releasable adhesive tape member 18 projecting outwardly farther from the notch portion 56 of the mount body 52. Further, at this time, the cover member 54 can be moved between a first position where the main portion 60 conceals the grip portion 18a of the adhesive tape member 18 sticking out from the mount body 52 (FIG. 6(a)) and a second position where it exposes the grip portion 18a of the adhesive tape member 18 (FIG. 6(b)).

When the article support device 50 is in the normal usage state, the cover member 54 is placed at the first position. In this position, the arm portion 64 of the cover member 54 and part of the adjoining main portion 60 are fit snugly in the notch portion 56 of the mount body 52 and the holding tabs 66 and 68 are fit in a fastening manner in the corresponding grooves (not shown) of the mount body 52. As a result, the cover member 54 is engaged and held at the first position on the mount body 52.

When detaching the article support device 50 from the base surface, the user grips the cover member 54, applies force in the longitudinal direction so that it moves away from the mount body 52, and detaches the holding tabs 66 and 68 from the corresponding grooves. As a result, the cover member 54 leaves the first position and moves straight under sliding engagement of the pins (not shown) of the arm portion 64 and the corresponding grooves of the mount body 52. The user then pivots the main portion 60 of the cover member 54 about the integral hinge 62 to move it to the second position where the main portion 60 is positioned under the mounter 42. By this two-step operation, the grip portion 18a of the adhesive tape member 18 can be sufficiently exposed while avoiding interference between the main portion 60 of the cover member 54 and the mounter 42.

Next, the user uses one hand to firmly grasp the mounter 42 of the mount body 52 while holding the cover member 54 at the second position and uses the other hand to grip the grip portion 18a of the exposed adhesive tape member 18 and stretch it in a direction away from the mount body 52. In this manner, the adhesive tape member 18 is removed from the mount body 52 and base surface.

Figure 7A:
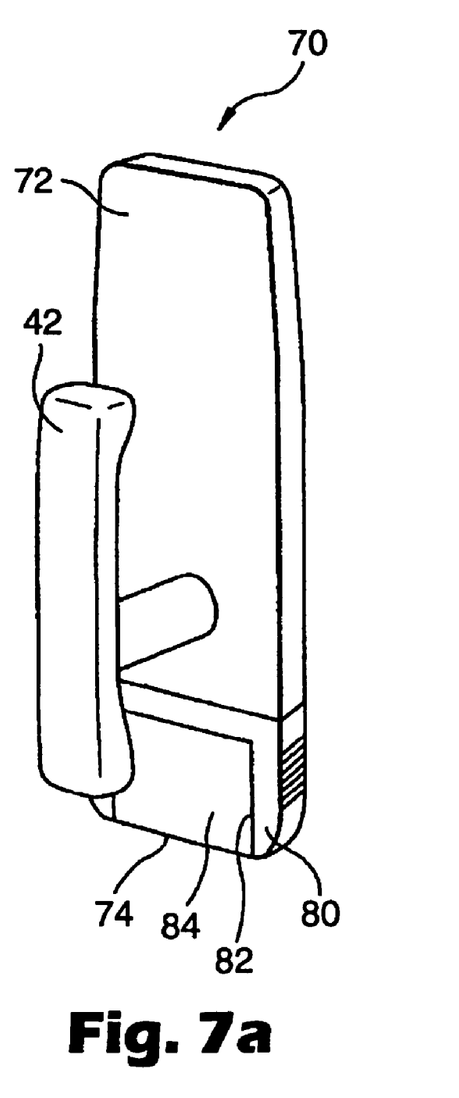
FIGS. 7a and 7b are perspective views of an article support device according to another embodiment of the present invention, where (a) shows the state where the cover member is at a first position and (b) shows the state where the cover member is at a second position.
Figure 7B:
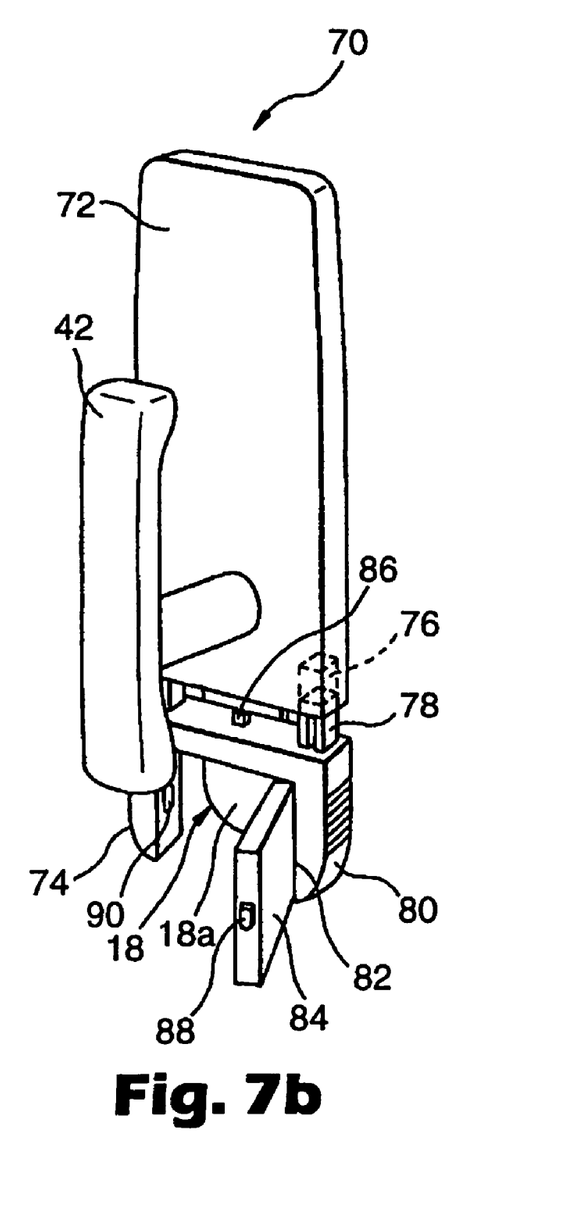

FIG. 7 shows an article support device 70 according to still another embodiment of the present invention. The article support device 70 has substantially the same configuration as the above article support device 40 except for the configurations of the mount body and the cover member, so corresponding components are assigned common reference numerals and explanations thereof are omitted. That is, the article support device 70 is provided with a mount body 72 having a mounter 42 and a cover member 74 movably connected to the mount body 72.

The mount body 72 is provided with a pair of groove holes 76 extending parallel to each other at one end in the longitudinal direction (bottom end in the figure). The groove holes 76 receive a pair of guide shafts projecting from one edge of the cover member 74 in a manner slidable in the longitudinal direction across a predetermined range. The cover member 74 has an outer frame portion 80 having a substantially U-shape contour and a main portion 84 connected to the inside of the outer frame portion 80 through an integral hinge 82. The outer frame portion of the cover member 74 is provided at one side edge with a pair of guide shafts 78 and holding tabs 86 corresponding to the above-mentioned holding tabs 34. Further, the main portion 84 of the cover member 74 is provided on one side edge with a holding tab 88. The holding tab 88 provided on the main portion 84 can be snapped into a recess 90 provided at the inside edge of the outer frame portion 80.

During use, the mount body 72 is fastened to the adhesive tape member 18 and attached to the base surface by the adhesive tape member 18 in the state with the grip portion 18a of the stretch releasable adhesive tape member 18 sticking out further from one end of the mount body 52 in the longitudinal direction (bottom end in the figure). Further, at this time, the cover member 74 can be moved between a first position where the main portion 84 conceals the grip portion 18a of the adhesive tape member 18 sticking out from the mount body 72 (FIG. 7(a)) and a second position where it exposes the grip portion 18a of the adhesive tape member 18 (FIG. 7(b)).

When the article support device 70 is in its normal usage state, the cover member 74 is placed at the first position. At this time, the pair of guide shafts 78 of the cover member 74 are pulled into the corresponding groove holes 76 of the mount body 72 and the holding tab 86 is inserted in a fastening manner into the corresponding groove (not shown) of the mount body 72. Further, the main portion 84 of the cover member is received inside the outer frame portion 80 and the holding tab 88 is fit into the recess 90. As a result, the cover member 74 is engaged and held at the first position on the mount body 72.

When detaching the article support device 70 from the base surface, the user grips the outer frame portion 80 of the cover member 74, applies force in the longitudinal direction so that it moves away from the mount body 72, and detaches the holding tab 86 from the corresponding groove. As a result, the cover member 74 leaves the first position and moves straight under sliding engagement of the guide shafts 78 and the corresponding groove holes of the mount body 72. The user then pivots the main portion 84 of the cover member 74 about the integral hinge 82 to move it to the second position where the main portion 84 sticks out from the outer frame portion 80 and exposes the inside of the outer frame portion 80. By this two-step operation, the grip portion 18a of the adhesive tape member 18 can be sufficiently exposed while avoiding interference between the main portion 84 of the cover member 74 and the mounter 42. Next, the user uses one hand to firmly grasp the mounter 42 of the mount body 72 while holding the cover member 74 at the second position and uses the other hand to grip the grip portion 18a of the exposed adhesive tape member 18 and stretch it in a direction away from the mount body 72. In this manner, the adhesive tape member 18 is removed from the mount body 72 and base surface.

Figure 8A:
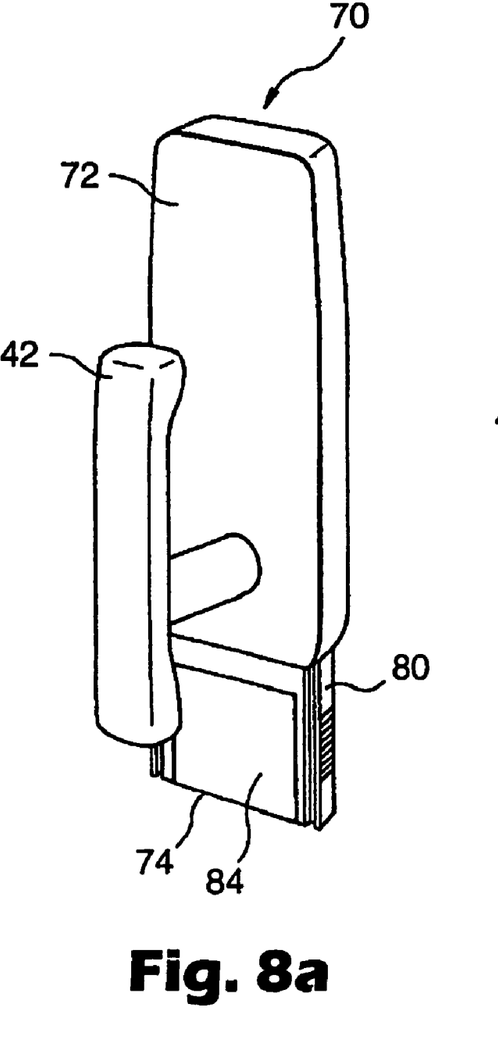
FIGS. 8a and 8b are perspective views of a modification of the article support device of FIG. 7, where (a) shows the state where the cover member is at a first position and (b) shows the state where the cover member is at a second position.
Figure 8B:
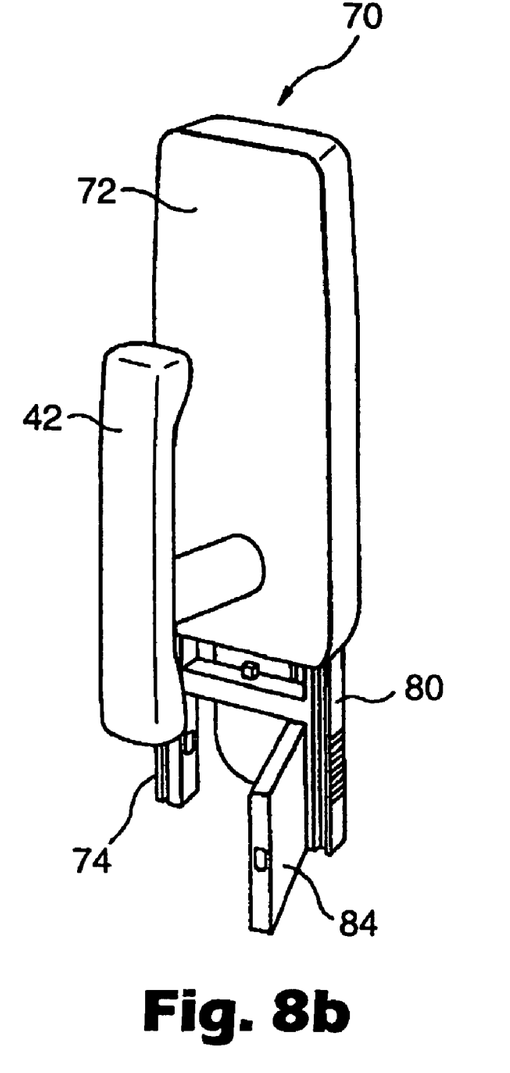

It will be recognized that the article support device 70 may also be configured in the design of the outer frame portion 80 of the cover member 74 as shown as a modification in, for example, FIG. 8.

Figure 9A:
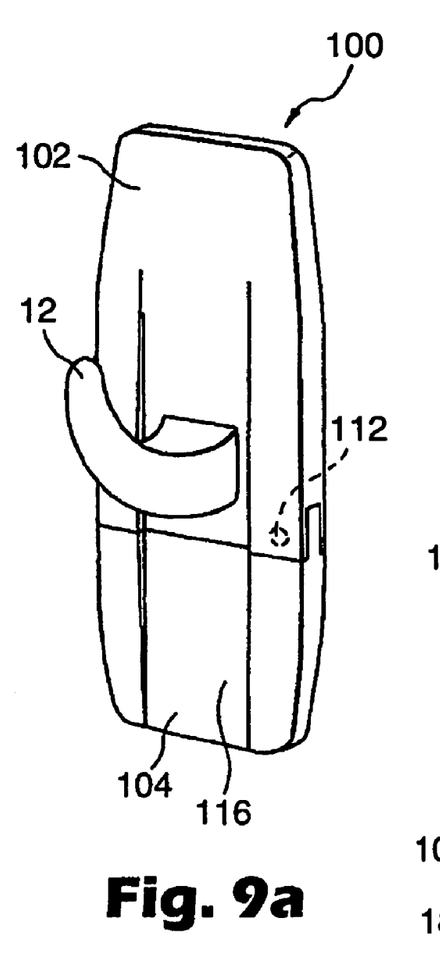
FIGS. 9a and 9b are perspective views of an article support device according to another embodiment of the present invention, where (a) shows the state where the cover member is at a first position and (b) shows the state where the cover member is at a second position.
Figure 9B:
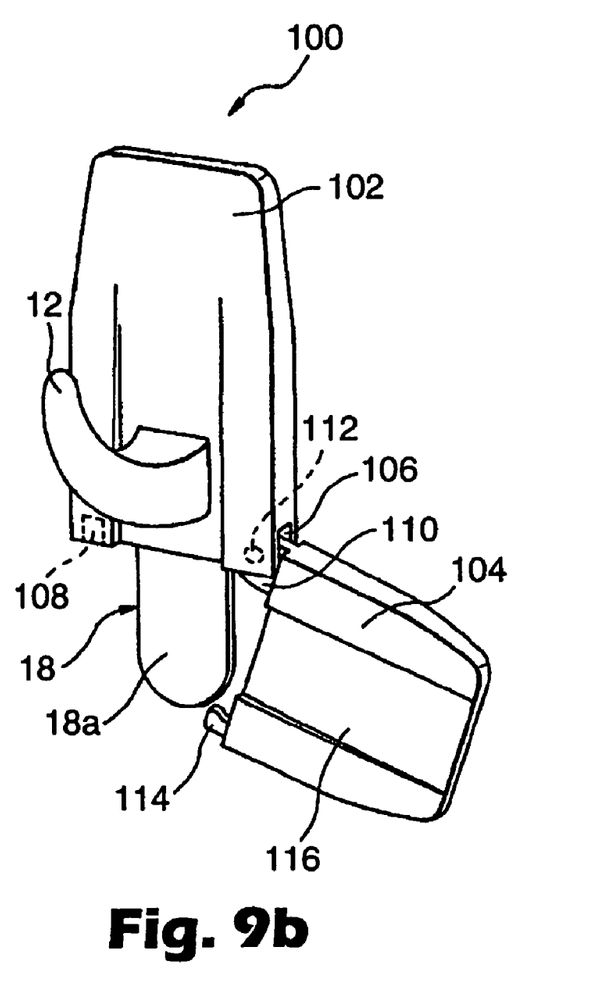

FIG. 9 shows an article support device 100 according to still another embodiment of the present invention. The article support device 100 has substantially the same configuration as the above article support device 10 except for the configurations of the mount body and the cover member, so corresponding components are assigned common reference numerals and explanations thereof are omitted. That is, the article support device 100 is provided with a mount body 102 having a mounter 12 and a cover member 104 movably connected to the mount body 102.

The mount body 102 is provided with large and small grooves 106 and 108 at one end in the longitudinal direction (bottom end in the figure). The large groove 106 receives a tongue piece 110 projecting out from one edge of the cover member 104 and supported pivotally through a pin 112. Further, the small groove 108 may have fastened or snapped into it a holding tab 114 projecting out from one edge of the cover member 104. The cover member 104 has a plate-shaped main portion 116 and is provided with the tongue piece 110 and holding tab 114 at one edge of the main portion 116.

When the article support device 100 is used, the mount body 102 is fastened to the adhesive tape member 18 and attached to the base surface through the adhesive tape member 18 in the state with the grip portion 18a of the stretch releasable adhesive tape member 18 sticking out further from one end of the mount body 102 in the longitudinal direction (bottom end in the figure). Further, at this time, the cover member 104 can be moved between a first position where the main portion 116 conceals the grip portion 18a of the adhesive tape member 18 projecting outwardly from the mount body 102 (FIG. 9(a)) and a second position exposing the grip portion 18a of the adhesive tape member 18 (FIG. 9(b)).

While the article support device 100 is in the normal usage state, the cover member 104 is placed at the first position in which the holding tab 114 of the cover member 104 is fastened or snapped into the small groove 108 of the mount body 102. As a result, the cover member 104 is engaged and held at the first position on the mount body 102.

When detaching the article support device 100 from the base surface, the user grips the cover member 104, applies force so that it moves away from the mount body 102 in the counterclockwise direction about the pin 112, and detaches the holding tab 114 from the small groove 108. As a result, the cover member 104 leaves the first position, pivots in the counterclockwise direction about the pin 112, and moves to the second position. By this pivoting operation, the grip portion 18a of the adhesive tape member 18 can be sufficiently exposed. Next, the user uses one hand to firmly grasp mainly the mounter 12 of the mount body 102 while holding the cover member 104 at the second position and uses the other hand to grip the grip portion 18a of the exposed adhesive tape member 18, stretch it in a direction away from the mount body 102, and thereby remove the adhesive tape member 18 from the mount body 102.

Figures 10A, 10B:
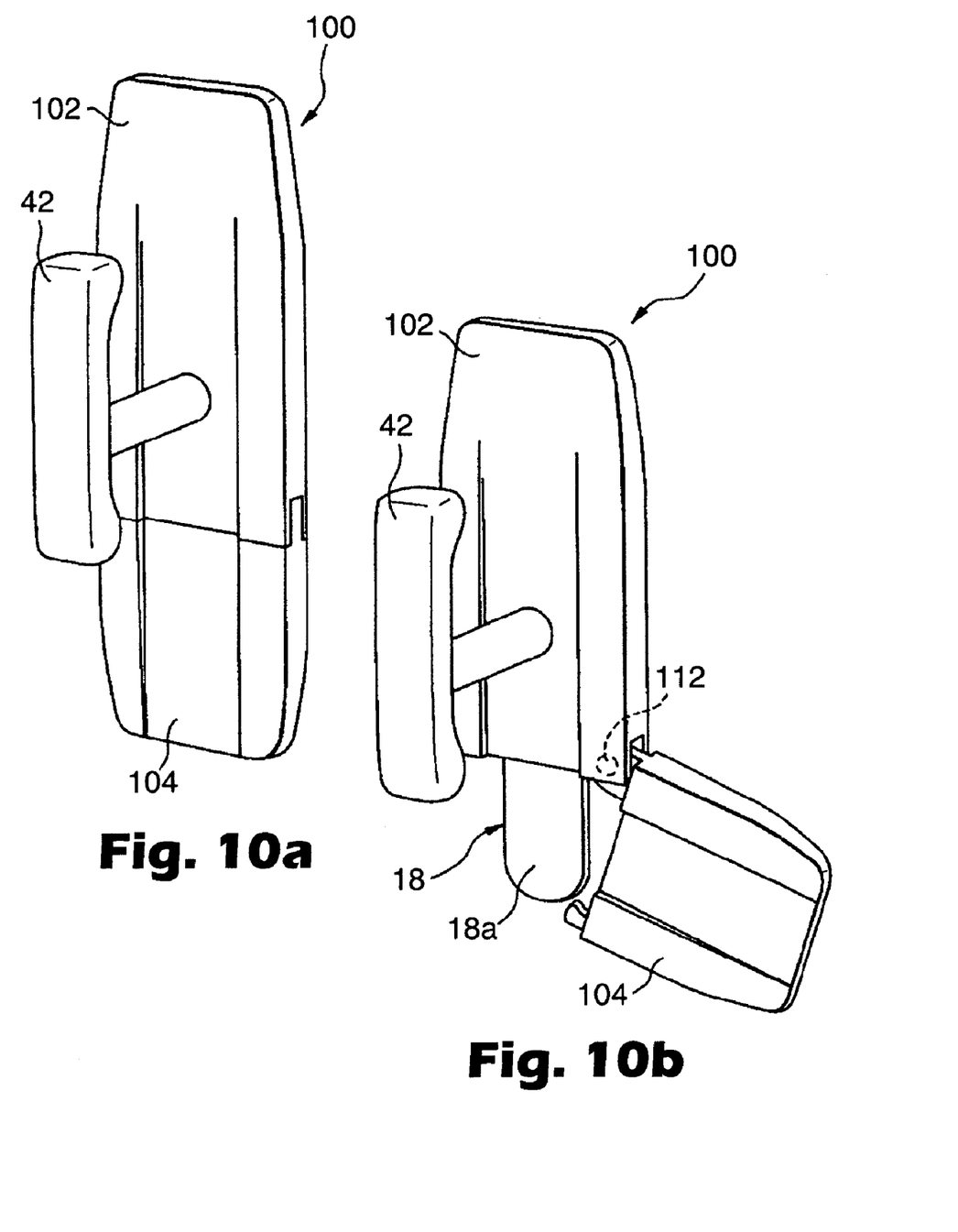
FIGS. 10a and 10b are perspective views of a modification of the article support device of FIG. 9, where (a) shows the state where the cover member is at a first position and (b) shows the state where the cover member is at a second position.

It will be recognized that the article support device 100, as shown for example as a modification in FIG. 10, can also be configured to have a substantially T-shaped mounter 42 able to effectively function as for example a curtain sash hook. In this configuration, by just pivoting the cover member 104 with respect to the mount body 102, the cover member 104 can be placed at the second position and the grip portion 18a of the adhesive tape member 18 can be sufficiently exposed while avoiding interference between the cover member 104 and the mounter 42.

While various embodiments of the present invention were explained above, the present invention is not limited to a device having a mounter functioning as a hook as in the illustrated embodiments. For example, it will be understood that it can also be embodied as an article support device provided with a mounter having a clip, hanger, or other functional configuration.

What is claimed is:

1. An article support device capable of being attached to a surface using a stretch-releasable adhesive tape member to support an article on the surface, comprising:
    a support body including an article support section and further including at least one notch; and
    a cover member including at least one projection for engagement within the notch to slidably couple the cover member to said support body;
    wherein said support body is fixedly adhered with a stretch-releasable adhesive tape member and being attached to a surface by said adhesive tape member, with a part of said adhesive tape member projecting outwardly from said support body; and further wherein said cover member is capable of moving between a first position for hiding the part of said stretch-releasable adhesive tape member projecting from said support body and a second position for exposing the part of said adhesive tape member when said support body is attached to the surface by said adhesive tape member, wherein the cover member is coplanar with the support body when in the first position and the projection linearly and pivotally moves within the notch so that the cover member moves linearly and rotates relative to said support body to shift between said first and second positions.

2. An article support device as set forth in claim 1, further comprising a holding mechanism for securely holding said cover member in said first position on said support body.

3. An article support device as set forth in claim 1, wherein said article support section of said support body includes a hook.

4. An article support device capable of being attached to a surface, comprising:
    a support body including an article support section that projects outwardly from one surface of the support body and further includes at least one notch; and
    a cover member including at least one projection for engagement within the notch to slidably couple the cover member to the support body;
    a stretch-releasable adhesive tape member adhered on one side to the support body and adhered on an opposite side to the surface, the stretch-releasable tape member having a grip portion projecting outwardly from the support body;

wherein the projection linearly and pivotally moves within the notch so that the cover member pivots between a first position for hiding the grip portion of the stretch-releasable adhesive tape member and a second position for exposing the grip portion of the adhesive tape member when the support body is attached to the surface by the adhesive tape member.

5. An article support device capable of being attached to a surface comprising:

a support body including an article support section that is a hook that projects outwardly from one surface of the support body and further includes a first notch and a second notch parallel to the first notch; and a cover member including a first projection for engagement within the first notch and a second projection for engagement with the second notch to movably couple the cover member to said support body;

a stretch-releasable adhesive tape member comprising an adhesive portion and a non-adhesive grip portion;

wherein the projections linearly and pivotally move within the notches;

wherein the support body is adhered to the adhesive portion of the stretch-releasable adhesive tape and the non-adhesive grip portion projects from the support body and is hidden by the cover member when in a first position and the non-adhesive grip portion is exposed when the cover member is in a second position.

* * * * *